Patented Sept. 16, 1947

2,427,636

UNITED STATES PATENT OFFICE 2,427,636

VALVE PACKING COMPOSITION

William E. Vaughan, Berkeley, and Hartwell C. Kennedy, Oakland, Calif., assignors to Shell Development Company, San Francisco, Calif., a corporation of Delaware No Drawing. Application March 1, 1944, Serial No. 524,845

11 Claims. (Cl. 252—14)

The present invention relates to an improved valve packing composition and more particularly to a valve packing composition especially adapted for use in high pressure valves under severe oxidizing conditions.

Various packing compositions have been employed in the past for packing valves of the common type wherein the valve stem passes through a chamber which is filled with the packing material and a threaded follower employed to retain the packing material under pressure and thus seal against leakage around the valve stem. Such packing compositions usually include a filler, such as asbestos, leather, fibrous organic material, etc., and a lubricant such as graphite, oil, graphite-oil mixtures, talc, soapstone, etc. It is well known, however, that such packing compositions are generally considered unsatisfactory for use in oxygen service or under oxidizing conditions, particularly when pressure is also a factor to be considered. Inflammable materials, as for example oil, must be avoided under such conditions due to the inherent fire and explosion hazards. Non-inflammable compositions, such as asbestos-soapstone, have been found to solidify and render manipulation of the valve extremely difficult, eventually scoring and damaging the valve stem, necessitating their replacement at frequent intervals.

It is an object of the present invention to provide an improved packing composition of the type described above which is extremely resistant to oxidation and accordingly suitable for use in oxygen and similar service. A further object is to provide an improved packing composition which will not solidify after prolonged exposure to oxygen or oxygen containing materials. A still further object is to provide an improved valve packing which may be easily prepared from readily available materials. Other objects, together with some of the advantages to be derived in employing the present invention, will become apparent from the following detailed description thereof.

The primary ingredients of the present improved valve packing comprise a lubricant having a laminar crystal structure, a plasticizer which may also act as a lubricant and comprise certain organo-silicon compounds, and a bulk filler material.

Suitable lubricants having the desired laminar crystal structure include molybdenite, tungstenite, micas, graphites and talcs in various naturally occurring forms. Generally, for the present purposes, these materials are employed in a pulverulent form.

Plasticizers suitable for use in the compositions of the present invention comprise those of the compounds known in the chemical literature as "siloxanes" which are normally liquid and do not thermally polymerize to resinous solids at the temperature of their intended use. The compounds of this type best suited for the purposes of the present invention have the structural formula

wherein R and $R_1$ are the same or different alkyl or aryl radicals or any other organic radicals capable of direct union with the silicon atom to form a normally liquid compound. The liquid polymers of these compounds are also satisfactory for use as plasticizers in the present packing compositions.

Another group of suitable siloxane compounds includes these polymeric siloxanes wherein one of the radicals of the above structural formula is replaced by oxygen, i. e. compounds having in polymeric form the unit structure

wherein R is an alkyl or aryl radical or any other organic radical capable of direct union with the silicon atom to form a normally liquid polymeric compound. Broadly, any organic siloxanes or polymers thereof which are liquid and remain liquid or semi-liquid at a temperature of approximately 20° C. or below may be incorporated in the present packing compositions as plasticizers.

The organic radicals of the above compounds, preferably, should not contain more than one olefinic double bond.

The following are suitable examples of specific compounds of the character described above: methoxy siloxane, dimethyl silicone, ethoxy silicone, diethyl silicone, propyl silicone, dioctyl siloxane, bis - (2 - ethylhexyl)-silicone, methyl aryl silicone, methyl phenyl siloxane, diphenyl silicone, dibenzyl silicone, etc., mixtures of these compounds and polymers of the same which are liquid at approximately 20° C.

The preferred bulk fillers for use in the present packing composition are non-combustible fibrous materials such as glass fibers, asbestos fibers and the like. However, if the packing is to be used in other than oxygen or analogous service, leather, chamois, cellulosic material and other generally employed bulk fillers will be found satisfactory.

The following specific examples serve to illustrate preferred packing compositions of the invention:

Example I

A firm bodied paste was prepared by mixing 14 parts by weight of puverulent molybdenite with 4.6 parts by weight of liquid polymeric dimethyl siloxane. To this paste was added 0.4 part by weight of short cut glass fiber. A valve packing gland was packed with long threads of glass fiber heavily coated with the above paste. This packing did not leak under 1800 p. s. i. oxygen pressure nor was there any indication of leakage or valve stem seizure after 6 months of service at 50 p. s. i. oxygen pressure. The valve remained smooth working and the desired accurate regulation of flow was easily obtained.

The dimethyl siloxane polymer used in this packing composition had the following properties:

Specific gravity at 30° C _____ 0.9634
Refractive index at 30° C _____ 1.4013
Surface tension, dynes/cm _____ 22.7

Example II

A paste was prepared by mixing 19.5 parts by weight of pulverulent molybdenite 13.4 parts by weight of the above dimethyl siloxane polymer. The paste thus prepared was used to impregnate 7 parts by weight of clean, fluffy asbestos cord having a diameter of $\tfrac{1}{16}$ inch. This packing, installed in a valve, did not leak under 1800 p. s. i. oxygen pressure and gave no indication of failure after 5 months' hydrogen bromide service at 375 p. s. i. pressure. Hydrogen bromide is well known to be one of the most corrosive chemical compounds and, accordingly, one of the most deleterious in its effects upon conventional packings. Conventional packings comprising asbestos impregnated with oil and graphite normally fail within approximately 2 months under these conditions due to solidification of the packing and consequent seizure of the valve stem. No indication of failure was observed in a valve packed with this material after 6 months' oxygen service at 50 p. s. i. pressure.

Example III

Asbestos cord was impregnated with a paste comprising pulverulent molybdenite and bis-(2-ethylhexyl)-siloxane. A valve packed with this composition had a satisfactorily smooth action and withstood 1800 p. s. i. oxygen pressure.

Example IV

Asbestos cord was impregnated with a paste comprising pulverulent molybdenite and dibenzyl siloxane. A valve packed with this composition also had a satisfactorily smooth action and withstood 1800 p. s. i. oxygen pressure.

Example V

Asbestos cord was impregnated with a paste comprising 14 parts by weight of pulverulent molybdenite, 4.6 parts by weight of liquid polymeric dimethyl siloxane (as specified in Example I) and 0.4 part by weight of short cut glass fiber. After 4 months' service handling oxygen at 50 p. s. i. pressure, a valve packed with this material gave no evidence of failure.

It will be appreciated, of course, that the particular quantities of the various components of the packings described in the above example are by way of illustration only, and will of necessity vary with the particular lubricant, siloxane and bulk filler employed if optimum results are to be obtained. In general, when employing molybdenite as a lubricant, it has been found that approximately 1 part by weight of a siloxane to 3 parts by weight of molybdenite yields a suitable paste for the purposes of the present invention. Satisfactory packings may be prepared, however, using from approximately 1 to 20 parts by weight of molybdenite to one part by weight of a siloxane.

The particular quantity of paste to be added depends upon the conditions under which the packing is to be used. For example, in packings for high pressure service, a light paste is preferably prepared by intimately mixing from approximately 1 to approximately 10 parts by weight of lubricant with one part by weight of siloxane, with which may be mixed, if desired, small particles of bulk filler in quantities set forth below. The light paste thus obtained is then used to impregnate asbestos cord, long strands of glass fiber braided into cord, and the like to form the finished packing. The impregnation may be advantageously carried out by repeatedly drawing the cord through a body of the paste, a pressurized atmosphere being applied if necessary to thoroughly impregnate and/or coat the individual strands of the cord as well as to fill the interstices of the cord structure.

In packing for low pressure service, i. e. for pressures not exceeding approximately 150 p. s. i., a heavier paste comprising from about 10 to about 20 parts by weight of lubricant to one part by weight of siloxane may be prepared and amounts of small articles of bulk filler added as set forth below. For this type of service, the heavy paste may be inserted directly into gland as the packing without additional support in the form of a cord of bulk filler as employed in packings for high pressure service. Retainers formed of non-impregnated bulk filler in the form of cord may be advantageously employed at each end of the packing gland when using very light or semi-liquid pastes in low pressure packing service. The high pressure packing described hereinbefore is, of course, also suitable for low pressure service.

It has been found that a superior packing is obtained if the lubricant and siloxane are first mixed to form a paste and the bulk filler in small particles and the desired quantities thereafter worked into and mixed with the paste, the finished paste comprising three components being used to impregnate a support consisting of long strands of bulk filler, if the packing is to be used in high pressure service.

When using asbestos as the filler, packings suitable for most purposes may be prepared by adding from approximately 2 to approximately 10 parts by weight of the siloxane-lubricant paste to the filler, preferably approximately 5 parts by weight of the paste to form a bodied paste. With glass fiber as a filler, suitable packings may be prepared by incorporating from approximately 5 to approximately 40 parts or more by weight of the paste with one part by weight of filler, preferably approximately 10 parts by weight of paste. The bulk filler incorporated with the paste should be, preferably, in the form of small particles, i. e. the greatest linear dimension of a particle should not exceed the diameter of the packing gland in which it is to be used.

The present packing compositions may be used in any type of packing gland wherein conventional packings of the general type discussed hereinbefore are commonly employed and are particularly suited for use in glands comprising a chamber through which the element to be sealed passes and a follower or packing retainer serving to secure the packing material in pressure contact with the element to be sealed and the inner walls of the packing chamber.

We claim as our invention:

1. A packing composition which is inert to oxidizing action, comprising long strands of non-combustible fibrous material, impregnated with a paste consisting essentially of approximately 1 to 10 parts by weight of an inorganic pulverulent lubricant having a laminar crystal structure and approximately 1 part by weight of an organic siloxane of the group of alkyl and aryl siloxane, said organic siloxane remaining liquid at about 20° C.

2. A packing composition which is inert to oxidizing action comprising long strands of non-combustible fibrous material, impregnated with a paste consisting essentially of approximately 1 to 10 parts by weight of an inorganic pulverulent lubricant having a laminar crystal structure and approximately 1 part by weight of an organic siloxane of the group of alkyl and aryl siloxane, said organic siloxane remaining liquid at about 20° C. and approximately 2 to 10 parts by weight of a non-combustible fibrous material in the form of small particles.

3. A packing composition which is inert to oxidizing action comprising long strands of non-combustible fibrous material, impregnated with a paste consisting essentially of approximately 1 to 10 parts by weight of pulverulent molybdenite and approximately 1 part by weight of an organic siloxane of the group of alkyl and aryl siloxane, said organic siloxane remaining liquid at about 20° C.

4. A packing composition which is inert to oxidizing action, comprising long strands of non-combustible fibrous material, impregnated with a paste consisting essentially of approximately 1 to 10 parts by weight of an inorganic pulverulent lubricant having a lamina crystal structure and approximately 1 part by weight of an alkyl siloxane remaining liquid at about 20° C.

5. A packing composition which is inert to oxidizing action, comprising long strands of non-combustible fibrous material, impregnated with a paste consisting essentially of approximately 1 to 10 parts by weight of an inorganic pulverulent lubricant having a laminar crystal structure and approximately 1 part by weight of an organic siloxane of the group of aryl siloxane, said organic siloxane remaining liquid at about 20° C. and approximately 2 to 10 parts by weight of short cut glass fibers.

6. A packing composition which is inert to oxidizing action, comprising long strands of non-combustible fibrous material, impregnated with a paste consisting essentially of approximately 1 to 10 parts by weight of an inorganic pulverulent lubricant having a laminar crystal structure and approximately 1 part by weight of an organic siloxane of the group of alkyl and aryl siloxane, said organic siloxane remaining liquid at about 20° C. and approximately 2 to 10 parts by weight of short cut glass fibers.

7. A packing composition which is inert to oxidizing action, comprising long strands of non-combustible fibrous material, impregnated with a paste consisting essentially of approximately 1 to 10 parts by weight of an inorganic pulverulent lubricant having a laminar crystal structure and approximately 1 part by weight of an organic siloxane of the group of alkyl and aryl siloxane, said organic siloxane remaining liquid at about 20° C. and approximately 2 to 10 parts by weight of asbestos cord in the form of short particles.

8. A packing composition which is inert to oxidizing action comprising long strands of non-combustible fibrous material, impregnated with a paste consisting essentially of approximately 1 to 10 parts by weight of an inorganic pulverulent lubricant having a laminar crystal structure and approximately 1 part by weight of a polymeric dimethyl siloxane remaining liquid at about 20° C.

9. A packing composition which is inert to oxidizing action comprising long strands of non-combustible fibrous material, impregnated with a paste consisting essentially of approximately 1 to 10 parts by weight of an inorganic pulverulent lubricant having a laminar crystal structure and approximately 1 part by weight of dibenzyl siloxane remaining liquid at about 20° C.

10. A packing composition which is inert to oxidizing action, comprising long strands of non-combustible fibrous material impregnated with a paste consisting essentially of approximately 1 to 10 parts by weight of pulverulent molybdenite, approximately 1 part by weight of polymeric dimethyl siloxane remaining liquid at about 20° C. and approximately 2 to 10% by weight of short cut glass fibers.

11. A packing composition which is inert to oxidizing action, comprising long strands of non-combustible fibrous material impregnated with a paste consisting essentially of approximately 1 to 10 parts by weight of pulverulent molybdenite, approximately 1 part by weight of polymeric dimethyl siloxane remaining liquid at about 20° C. and approximately 2 to 10% by weight of asbestos cord in the form of short particles.

WILLIAM E. VAUGHAN.
HARTWELL C. KENNEDY.

REFERENCES CITED

The following references are of record in the file of this patent:

UNITED STATES PATENTS

| Number | Name | Date |
|---|---|---|
| 2,119,552 | MacLaren | June 7, 1938 |
| 2,235,438 | Leistensnider | Mar. 18, 1941 |
| 2,258,218 | Rochow | Oct. 7, 1941 |
| 2,258,219 | Rochow | Oct. 7, 1941 |
| 2,258,220 | Rochow | Oct. 7, 1941 |
| 2,258,221 | Rochow | Oct. 7, 1941 |
| 2,258,222 | Rochow | Oct. 7, 1941 |
| 1,458,574 | J. A. Cummings, Jr. | June 12, 1923 |
| Re. 2,584 | Botticher | Apr. 30, 1867 |

OTHER REFERENCES

Nomenclature of Organosilicon Compounds by Robert O. Sauer, Jour. of Chem. Education, June 1944, pages 303–305.